B. F. MOREY.
Tire for Wagons.
No. 86,029.　　　　　　　　　　　　　　Patented Jan'y 19, 1869.
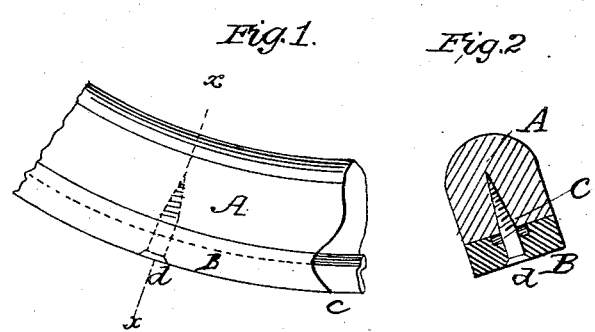
Witnesses.
A. W. Almqvist
Wm. A. Morgan
Inventor:
B. F. Morey
per Munn & Co.
Attorneys

BENJAMIN F. MOREY, OF CLINTON, INDIANA.

Letters Patent No. 86,029, dated January 19, 1869.

IMPROVED TIRE FOR WAGONS.

The Schedule referred to in these Letters Patent and making part of the same.

*To all whom it may concern:*

Be it known that I, BENJAMIN F. MOREY, of Clinton, in the county of Vermillion, and State of Indiana, have invented a new and useful Improvement in Grooved Iron and other Metals; and I do hereby declare that the following is a full, clear, and exact description thereof, which will enable those skilled in the art to make and use the same, reference being had to the accompanying drawings, forming part of this specification.

This invention relates to a new and useful improvement in wagon-tires; and

It consists in forming one or more grooves on one side of the bar of iron, steel, or other metal, constituting the tire, the said grooved side being on the interior surface of the tire, and designed to be used as a receptacle for oil, when in contact with the flat exterior surface of the felloe.

Figure 1 represents a longitudinal section of grooved iron attached to a felloe or section of the rim of a wheel.

Figure 2 is a cross-section of fig. 1, through the line $x\ x$.

Similar letters of reference indicate corresponding parts.

A represents the felloe.

B is the grooved iron attached thereto.

The iron or metal may be of any desired size, suitable for wagon-tire or bands of any description, where it may be necessary or desirable to use grooved iron, steel, or other metal.

In the drawings, where the iron is used as wagon-tire, (and this is perhaps the principal use to which the grooved iron would be applied,) c represents the groove, its depth being indicated in dotted lines in fig. 1, with its cross-section seen in fig. 2.

The tire or band being shrunk on to the wood in the ordinary manner, will be much less likely to start from the wood than a smooth tire or band, as, in shrinking, the outer angles of the sides of the groove will indent themselves into the wood, and thereby hold the tire to its place.

But this is not the only advantage to be derived from the groove in the iron.

By having one or more proper apertures through the tire, with a screw or screws, which fasten into the wood, as indicated by the wood-screw d, in the drawing, oil or other liquid may be poured into the groove or grooves from time to time, and confined therein, by which oil or liquid the wood may be kept saturated, and thereby prevented from shrinking and swelling, and from decay.

Instead of a single groove, as represented in the drawing, there may be two or more grooves, with separate holes for oiling, or with such grooves united, so that oil or other liquid may enter all the grooves from one hole.

It will be seen that this will obviate the necessity of so frequently resetting wagon-tires, as the wheel would be prevented from absorbing water, and, consequently, the ruinous effects of constant swelling and shrinking would be avoided.

I am aware that wagon-wheel tires have been grooved interiorly, to fit a corresponding rib on the wheel, for the purpose of preventing lateral displacement of the tire, and I do not, therefore, claim broadly an interiorly-grooved tire; but having fully described my invention, What I do claim as new, and desire to secure by Letters Patent, is—

The grooved tire B, combined with the exterior flat surface of the felloe A, substantially as herein shown and described, and for the purpose specified.

BENJAMIN F. MOREY.

Witnesses:
JOHN H. BOGART,
JOHN G. CAMPBELL.